(12) United States Patent
Tsao et al.

(10) Patent No.: US 10,444,936 B2
(45) Date of Patent: Oct. 15, 2019

(54) DATA SHARING SYSTEM AND METHOD

(71) Applicant: HON HAI PRECISION INDUSTRY CO., LTD., New Taipei (TW)

(72) Inventors: Yu-Hung Tsao, New Taipei (TW); Fu-Yen Hsieh, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 133 days.

(21) Appl. No.: 15/498,511

(22) Filed: Apr. 27, 2017

(65) Prior Publication Data

US 2017/0315702 A1 Nov. 2, 2017

(30) Foreign Application Priority Data

Apr. 28, 2016 (CN) .......................... 2016 1 0271720

(51) Int. Cl.
*G06F 3/0481* (2013.01)
*G06F 3/0484* (2013.01)
*G06F 3/14* (2006.01)
*H04L 29/08* (2006.01)
*G06F 3/0488* (2013.01)
*G06F 3/0486* (2013.01)
*H04W 92/18* (2009.01)

(52) U.S. Cl.
CPC ........ *G06F 3/04817* (2013.01); *G06F 3/0486* (2013.01); *G06F 3/0488* (2013.01); *G06F 3/04845* (2013.01); *G06F 3/1454* (2013.01); *G06F 3/1462* (2013.01); *H04L 67/06* (2013.01); *H04L 67/141* (2013.01); *H04W 92/18* (2013.01)

(58) Field of Classification Search
CPC ............ G06F 3/04817; G06F 3/04845; G06F 3/0486; G06F 3/0488; G06F 3/1454; G06F 3/1462; H04L 67/06; H04L 67/141; H04W 92/18
See application file for complete search history.

(56) References Cited

U.S. PATENT DOCUMENTS

| 8,707,185 | B2 * | 4/2014 | Robinson | G06F 3/0481 |
| | | | | 705/319 |
| 9,716,861 | B1 * | 7/2017 | Poel | H04N 7/15 |
| 9,924,018 | B2 * | 3/2018 | Won | G06F 3/1462 |
| 2008/0270910 | A1 * | 10/2008 | Lukasik | H04L 67/08 |
| | | | | 715/740 |

(Continued)

*Primary Examiner* — Tadesse Hailu
(74) *Attorney, Agent, or Firm* — ScienBiziP, P.C.

(57) ABSTRACT

A data sharing method runs on a first electronic device comprising a number of first background pages. Each first background page displays a number of first application icons. The method comprises controlling the first electronic device to communicate with a second electronic device through a communication unit, acquiring second background pages from the second electronic device communicating with the first electronic device, and displaying the acquired second background pages on a display unit of the first electronic device. The method determines whether one second application icon of the second background pages displayed on the first electronic device is moved to one first background page of the first electronic device, and determines the moved second application icon as being a target icon.
Data of the target icon from the second electronic device is acquired.

12 Claims, 6 Drawing Sheets

(56) References Cited

U.S. PATENT DOCUMENTS

| | | | |
|---|---|---|---|
| 2010/0082567 A1* | 4/2010 | Rosenblatt | G06F 17/30017 707/705 |
| 2012/0088548 A1* | 4/2012 | Yun | G08C 17/02 455/557 |
| 2012/0144347 A1* | 6/2012 | Jo | G06F 3/04883 715/863 |
| 2013/0047104 A1* | 2/2013 | Chen | G06F 3/0481 715/765 |
| 2013/0060857 A1* | 3/2013 | Bezos | H04W 4/21 709/204 |
| 2013/0095801 A1* | 4/2013 | Kermoian | H04M 1/72597 455/414.1 |
| 2013/0318159 A1* | 11/2013 | Earnshaw | H04N 1/00347 709/204 |
| 2013/0325949 A1* | 12/2013 | Virani | G06F 9/541 709/204 |
| 2014/0016037 A1* | 1/2014 | Goldberg | G06F 9/452 348/600 |
| 2014/0181686 A1* | 6/2014 | Shin | G06F 3/1454 715/748 |
| 2014/0217330 A1* | 8/2014 | Worsley | B01J 21/063 252/504 |
| 2014/0244738 A1* | 8/2014 | Rydenhag | G06F 3/1423 709/204 |
| 2015/0155917 A1* | 6/2015 | Won | H04M 1/7253 455/41.1 |
| 2015/0324109 A1* | 11/2015 | Lee | G06F 1/1626 715/761 |
| 2016/0036810 A1* | 2/2016 | Kim | H04L 63/0861 726/7 |
| 2016/0110153 A1* | 4/2016 | Crandall | H04L 65/403 345/173 |
| 2016/0344814 A1* | 11/2016 | Yeom | H04L 63/104 |
| 2016/0352818 A1* | 12/2016 | Han | G06F 9/4893 |

* cited by examiner

DATA SHARING SYSTEM AND METHOD

CROSS-REFERENCE TO RELATED APPLICATIONS

This application claims priority to Chinese Patent Application No. 201610271720.0 filed on Apr. 28, 2016, the contents of which are incorporated by reference herein.

FIELD

The subject matter herein generally relates to data transmission field, especially relates to a data sharing system and method.

BACKGROUND

Smart phone provides convenience for daily life. However, the operation to transmit data between smart phones is complicated, thus affecting user experience.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
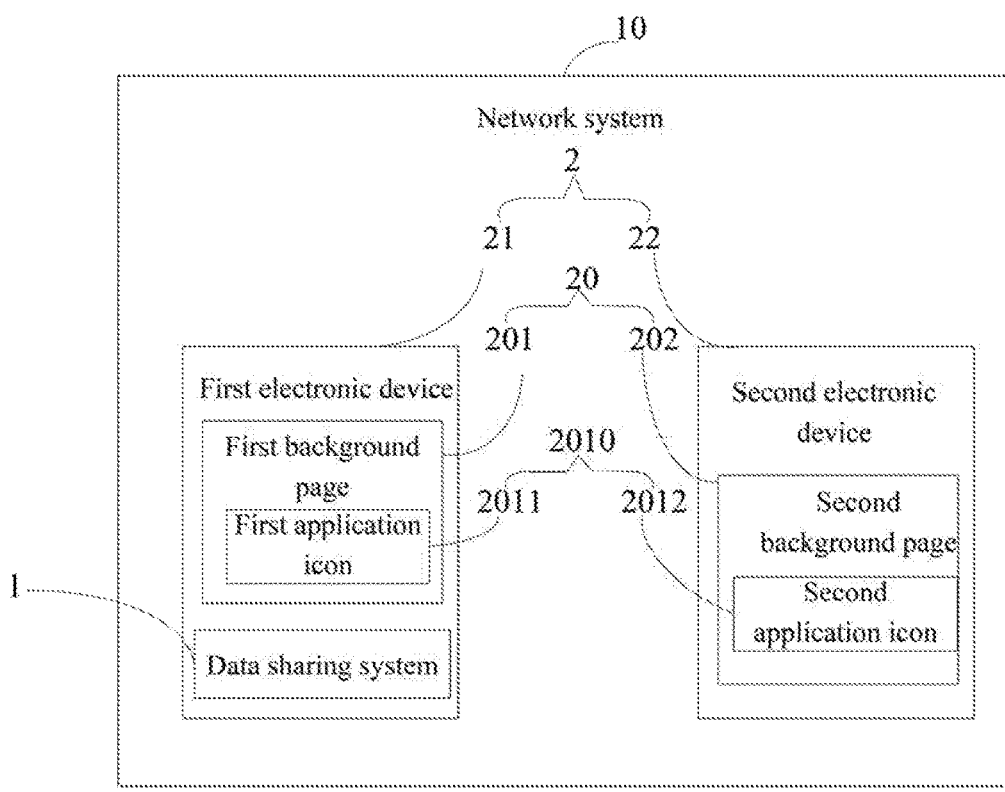
FIG. 1 is a block diagram illustrating an exemplary embodiment of a running environment of a data sharing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" exemplary embodiment in this disclosure are not necessarily to the same exemplary embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" indicates "including, but not necessarily limited to"; it specifically indicates open-ended inclusion or membership in a so-described combination, group, series, and the like.

FIG. 1 illustrates an exemplary embodiment of a running environment of a data sharing system 1. The system 1 runs in a network system 10. The network system 10 includes at least two electronic devices 2. The two electronic devices 2 can communicate with each other. In at least one exemplary embodiment, the system 1 is run in each of the two electronic devices 2.

Figure 2:
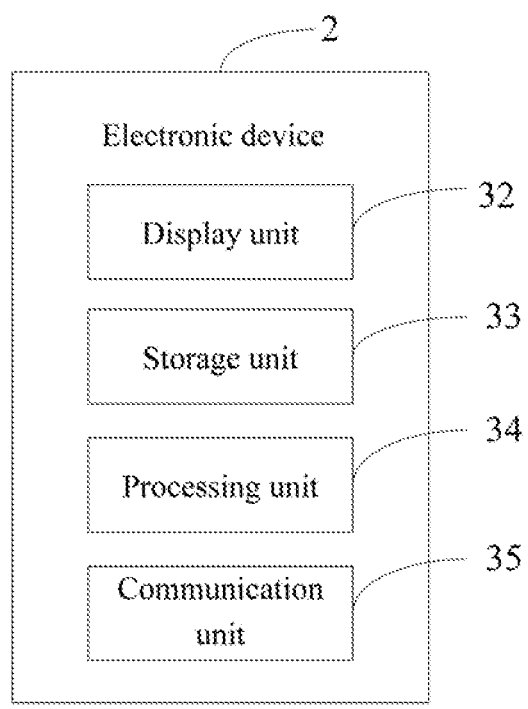
FIG. 2 is a block diagram of an exemplary embodiment of an electronic device of the system of FIG. 1.
Figure 3:
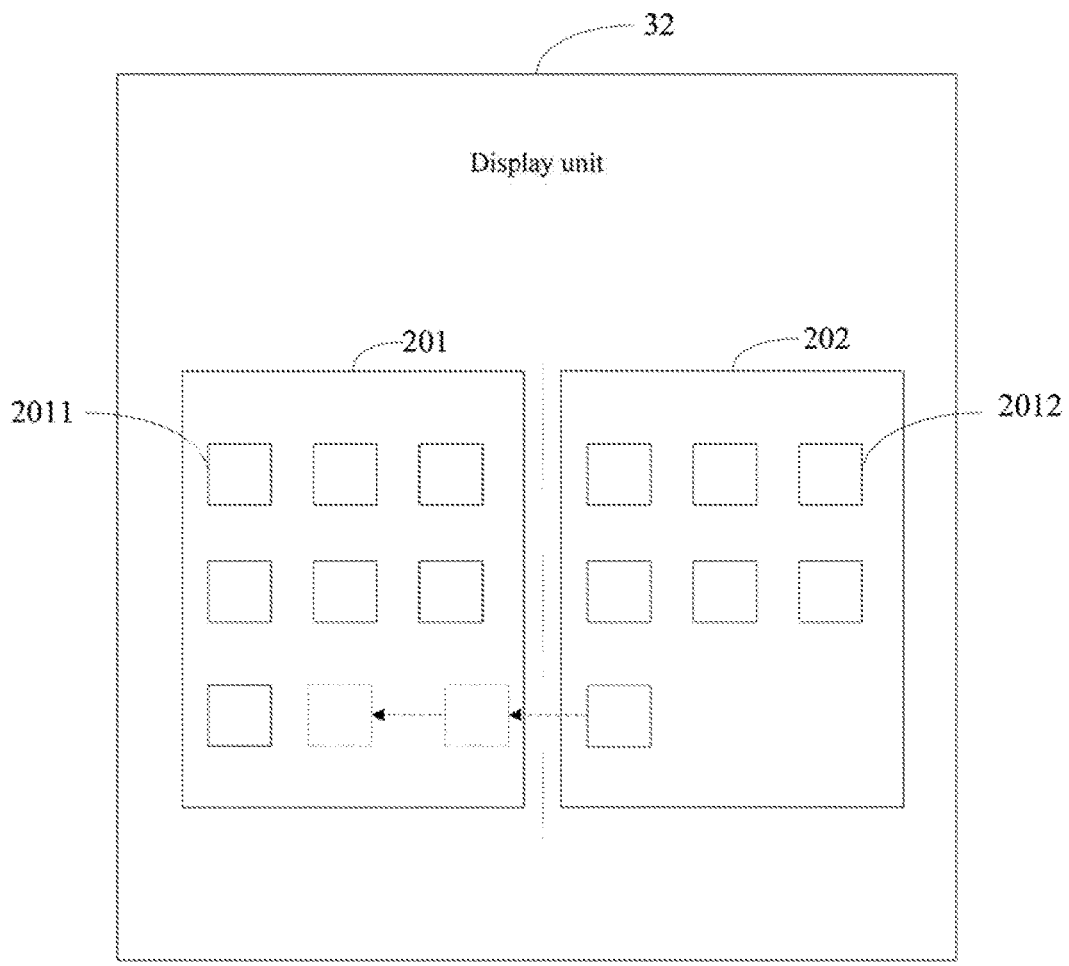
FIG. 3 is a diagrammatic view of a moving application icon of the electronic device.

FIG. 2 illustrates an exemplary embodiment of the electronic device 2. In at least one exemplary embodiment, the electronic device 2 can be a smart phone, table computer, notebook computer, or other suitable device. The electronic device 2 includes a display unit 32, a storage unit 33, at least one processing unit 34, and a communication unit 35. The display unit 32 displays at least one background page 20 (as shown in FIG. 1). In at least one exemplary embodiment, the display unit 32 can be a touch screen. The background page 20 includes a number of application icons 2010. Each application icon 2010 corresponds to target data. The target data includes text data, picture data, multimedia data, and application data. The two electronic devices 2 include a first electronic device 21 and a second electronic device 22. The first electronic device 21 includes at least one first background page 201, the at least one first background page 201 includes a number of first application icons 2011. The second electronic device 22 includes at least one second background page 202, the at least one second background page 202 includes a number of second application icons 2012.

Referring to FIGS. 1 and 2, the first electronic device 21 communicates with the second electronic device 22 through the communication unit 35. In at least one exemplary embodiment, the communication unit 35 can be a WI-FI communication chip or a BLUETOOTH communication chip. The storage unit 33 stores the target data of the application icon 2010, such as the target data of the first application icon 2011 or the target data of the second application icon 2012. The storage unit 33 can include various types of non-transitory computer-readable storage mediums. For example, the storage unit 33 can be an internal storage system, such as a flash memory, a random access memory (RAM) for temporary storage of information, and/or a read-only memory (ROM) for permanent storage of information. The storage unit 33 can also be an external storage system, such as a hard disk, a storage card, or a data storage medium. The processing unit 34 can be a central processing unit (CPU), a microprocessor, or other data processor chip.

Figure 4:
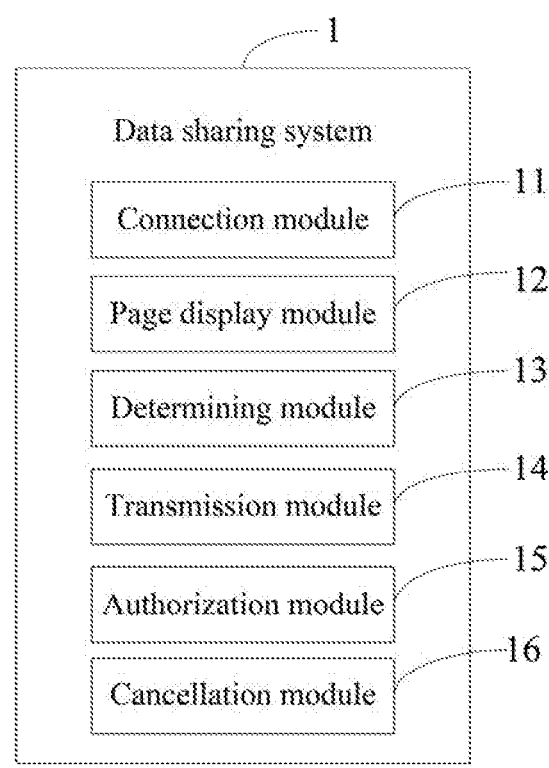
FIG. 4 is a function block diagram of the data sharing system of FIG. 1.

FIG. 4 illustrates an exemplary embodiment of the data sharing system 1. In at least one exemplary embodiment, the system 1 can include a connection module 11, a page display module 12, a determining module 13, a transmission module 14, an authorization module 15, and a cancellation module 16. The modules 11-16 of the system 1 can be collections of software instructions. In at least one exemplary embodiment, the software instructions of the connection module 11, the page display module 12, the determining module 13, the transmission module 14, the authorization module 15 and the cancellation module 16 are stored in the storage unit 33 and executed by the processing unit 34.

The connection module 11 is used to control the first electronic device 21 to communicate with the second electronic device 22 through the communication unit 35. The connection module 11 controls the first electronic device 21 to communicate with the second electronic device 22 through the WI-FI communication chip or BLUTOOTH communication chip. In another exemplary embodiment, the communication unit 35 can be a USB interface, the connection module 11 controls the first electronic device 21 to communicate with the second electronic device 22 through the USB interface.

The page display module 12 is used to acquire the second background pages 202 of the second electronic device 22 from the second electronic device 22, and display the acquired second background pages 202 on the display unit 32 of the first electronic device 21 after the first background pages 201. In at least one exemplary embodiment, the page display module 12 first acquires the second background pages 202 and determines a quantity of the second background pages 202. The page display module 12 then adds new pages, having the same quantity as the second background pages 202, after the first background pages 201 of the first electronic device 21. The page display module 12 displays the acquired second background pages 202 on the added new pages. For example, the display unit 32 of the first electronic device 21 displays the M first background pages 201. The second electronic device 22 displays the N second background pages 202. When the first electronic device 21 communicates with the second electronic device 22, the page display module 12 acquires the second background pages 202 from the second electronic device 22 and determines the quantity of the second background pages 202 as being N, and adds N new pages after the first background pages 201, and displays N acquired second background pages 202 on the added new pages.

In at least one exemplary embodiment, the page display module 12 displays connection state information between the first electronic device 21 and the second electronic device 22 on the display unit 32. For example, the page display module 12 displays a message to prompt the connection state information between the first electronic device 21 and the second electronic device 22 on the display unit 32.

The determining module 13 is used to determine whether one second application icon 2012 of the second background pages 202 displayed on the display unit 32 is moved to one first background page 201 of the first electronic device 21, and determines the moved second application icon 2012 as the target icon. That is, the user of the second electronic device 22 desires to share data of the moved second application icon 2012 with the first electronic device 21. In at least one exemplary embodiment, when a user touches one second application icon 2012 displayed on the display unit 32 and moves the second application icon 2012 to one first background page 201, the determining module 13 further determines that the first background page 201 that receives the moved second application icon 2012 is a target page, and displays the received second application icon 2012 on the target page. In another exemplary embodiment, when the first background page 201 of the first electronic device 21 has no more space to receive the moved second application icon 2012, the determining module 13 adds a new page, determines the new page as the target page, and displays the moved second application icon 2012 on the target page.

The transmission module 14 is used to control the first electronic device 21 to acquire the target data of the target icon from the second electronic device 22. In at least one exemplary embodiment, when the determining module 13 determines the target icon, and the transmission module 14 sends a request for reading data of the target icon to the second electronic device 22. When receiving the request, the second electronic device 22 sends the target data of the target icon to the first electronic device 21. The transmission module 14 further receives the target data of the target icon sent by the second electronic device 22. In at least one exemplary embodiment, the target data includes text data, picture data, multimedia data, and application data.

In another exemplary embodiment, the determining module 13 is also used to determine whether one first application icon 2011 displayed on the display unit 32 of the first electronic device 21 is moved to the second background page 202 of the first electronic device 21, and determines the moved first application icon 2011 as the target icon. That is, the user of the first electronic device 21 desires to share data of the moved first application icon 2011 to the second electronic device 22. The transmission module 14 is also used to send the target data of the target icon to the second electronic device 22.

In at least one exemplary embodiment, when data is shared between the first electronic device 21 and the second electronic device 22, the transmission module 14 further detects whether the first electronic device 21 is connected to the second electronic device 22. When the transmission module 14 detects that the first electronic device 21 is not connected to the second electronic device 22 as the first electronic device 21 is receiving the target data of the target icon from the second electronic device 22, the transmission module 14 stores the target data of the target icon that has been received, and continues to receive the remaining target data of the target icon when a connection is restored between the first electronic device 21 and the second electronic device 22.

The authorization module 15 is used to authorize the first electronic device 21 to acquire the target data of the target icon from the second electronic device 22. In at least one exemplary embodiment, the authorization module 15 displays an authorization interface on the display unit 32 when receiving the request for reading data of the target icon from the second electronic device 22. The authorization module 15 receives authorization information input by the authorization interface, compares the received authorization information with a preset authorization information stored in storage unit 33, and authorizes the first electronic device 21 to acquire the target data of the target icon when the received authorization information matches the preset authorization information. In at least one exemplary embodiment, the preset authorization information can be a character-based password or a fingerprint type of information.

Figure 5:
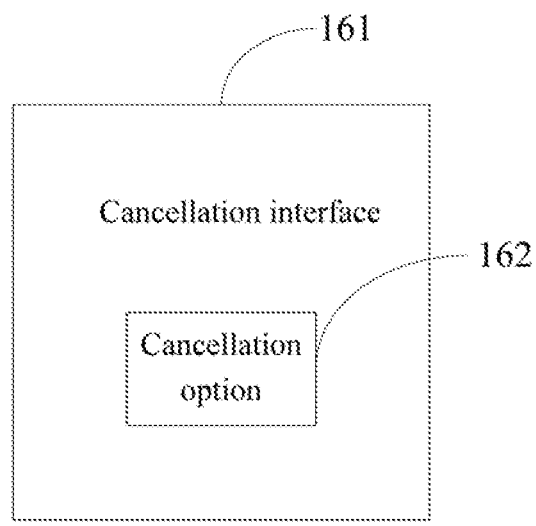
FIG. 5 is a diagrammatic view of a cancellation interface in the system of FIG. 1.

FIG. 5 illustrates a cancellation interface 161. The cancellation module 16 is used to display the cancellation interface 161 on the display unit 32 when the first electronic device 21 is receiving target data from the second electronic device 22. The cancellation module 16 cancels the receiving target data from the second electronic device 22 in response to a cancellation operation received from the cancellation interface 161. In at least one embodiment, the cancellation interface 161 displays a cancellation option 162. When a user chooses the cancellation option 162, the first electronic device 21 can receive the cancellation operation and the cancellation module 16 cancels the receiving target data from the second electronic device 22 in response to the cancellation operation.

Figure 6:
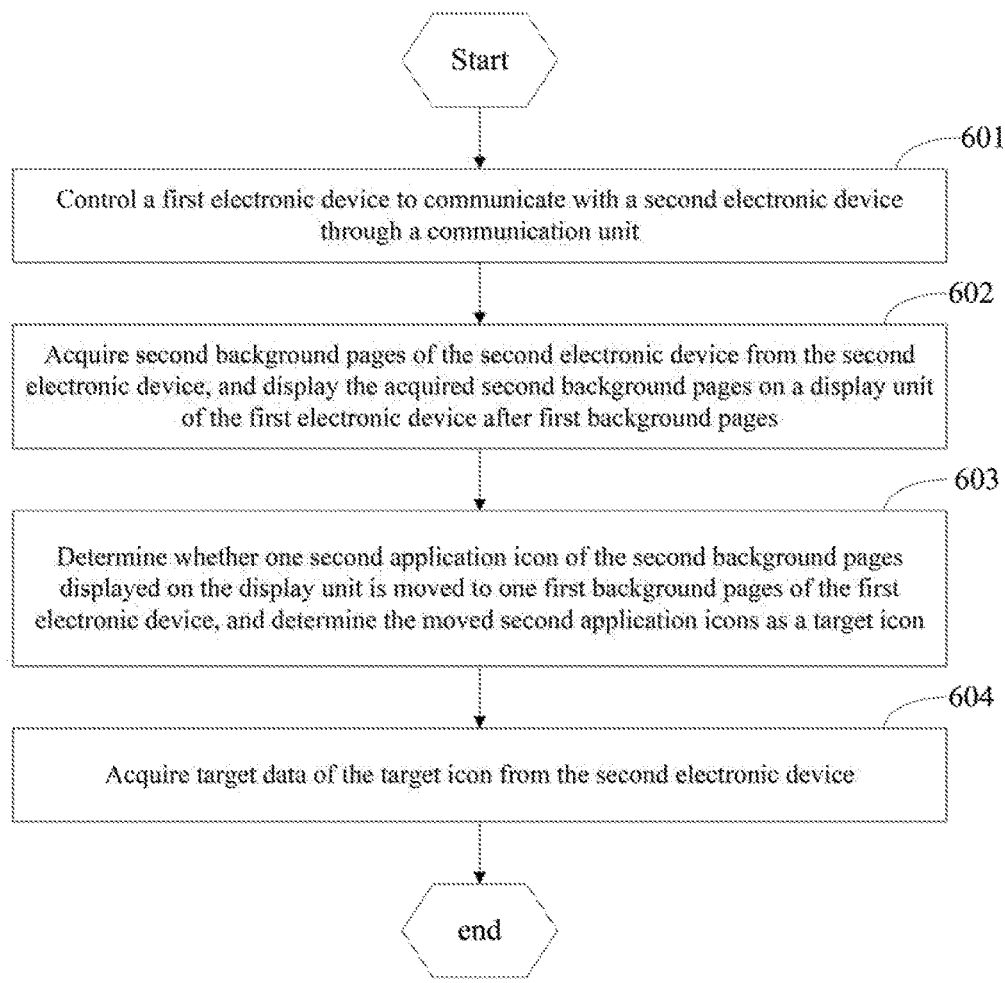
FIG. 6 is a flowchart of an exemplary embodiment of a data sharing method.

FIG. 6 illustrates a flowchart of an exemplary embodiment of a data sharing method. The method is provided by way of example, as there are a variety of ways to carry out the method. The method described below can be carried out using the configurations illustrated in FIGS. 1-5, for example, and various elements of these figures are referenced in explaining the example method. Each block shown in FIG. 6 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 601.

At block 601, a first electronic device communicates with a second electronic device through a communication unit.

In at least one exemplary embodiment, the communication unit can be a WI-FI communication chip or a BLUETOOTH communication chip, the first electronic device communicates with the second electronic device through the WI-FI communication chip or a BLUETOOTH communication chip. In another exemplary embodiment, the communication unit can be a USB interface, the first electronic device communicates with the second electronic device through the USB interface.

At block 602, the first electronic device acquires second background pages of the second electronic device from the second electronic device and displays the acquired second background pages on a display unit of the first electronic device after first background pages.

In at least one exemplary embodiment, the first electronic device acquires the second background pages including second application icons and determines a quantity of the second background pages, and adds new pages, having the same quantity as the second background pages, after first background pages of the first electronic device. The first electronic device further displays the acquired second background pages including the second application icons on the added new pages after the first background pages.

At block 603, the first electronic device determines whether one second application icon of the second background pages displayed on the display unit is moved to one first background page of the first electronic device, and determines the moved second application icons as the target icon.

In at least one exemplary embodiment, when a user touches one second application icon displayed on the display unit of the first electronic device and moves the second application icon to one first background page, the first electronic device further determines that the first background page, which receives the moved second application icon, is a target page, and displays the received second application icon on the target page. In another exemplary embodiment, when the first background pages of the first electronic device has no more space to receive the moved second application icon, the first electronic device adds a new page, determines the new page as the target page, and displays the moved second application icon on the target page.

At block 604, the first electronic device acquires target data of the target icon from the second electronic device.

In at least one exemplary embodiment, when determining the target icon, the first electronic device sends a request for reading data of the target icon to the second electronic device. When receiving the request, the second electronic device sends the target data of the target icon to the first electronic device and receives the target data of the target icon sent by the second electronic device. In at least one exemplary embodiment, the target data includes text data, picture data, multimedia data, application data.

In at least one exemplary embodiment, the method further includes: the electronic device displays connection state information between the first electronic device and the second electronic device on the display unit. For example, the first electronic device displays a message to prompt the connection state information between the first electronic device and the second electronic device on the display unit.

In at least one exemplary embodiment, the method further includes: the first electronic device determines whether one first application icon displayed on the display unit is moved to the second background page of the first electronic device, determines the moved first application icon as the target icon, and sends the target data of the target icon to the second electronic device.

In at least one exemplary embodiment, the method further includes: the first electronic device is authorized to acquire the target data of the target icon from the second electronic device. In at least one exemplary embodiment, the first electronic device displays an authorization interface on the display unit when receiving the request for reading data of the target icon from the second electronic device, receives authorization information input by the authorization interface, compares the received authorization information with a preset authorization information, and authorizes the first electronic device to acquire the target data of the target icon when the received authorization information matches the preset authorization information. In at least one exemplary embodiment, the preset authorization information can be a character-based password or a fingerprint type of information.

In at least one exemplary embodiment, the method further includes: the first electronic device displays a cancellation interface on the display unit when the first electronic device is receiving target data from the second electronic device, receives a cancellation operation input from the cancellation interface, and cancels the received target data from the second electronic device in response to the cancellation operation.

In at least one embodiment, the cancellation interface displays a cancellation option. When a user chooses the cancellation option, the first electronic device can receive the cancellation operation and cancel the receiving target data from the second electronic device in response to the cancellation operation.

It should be emphasized that the above-described exemplary embodiments of the present disclosure, including any particular exemplary embodiments, are merely possible examples of implementations, set forth for a clear understanding of the principles of the disclosure. Many variations and modifications can be made to the above-described exemplary embodiment(s) of the disclosure without departing substantially from the spirit and principles of the disclosure. All such modifications and variations are intended to be included herein within the scope of this disclosure and protected by the following claims.

What is claimed is:

1. A data sharing system, applied on a first electronic device, comprising a plurality of first background pages, each first background page displaying a plurality of first application icons, the system comprising:
 a plurality of modules being collections of instructions executable by at least one processor, the plurality of modules comprising:
  a connection module, upon execution by the at least one processor, controlling the at least one processor, the at least one processor controlling the first electronic device to communicate with a second electronic device through a communication unit;
  a page display module, upon execution by the at least one processor, controlling the at least one processor to acquire second background pages including a plurality of second application icons from the second electronic device, and to display the acquired second background pages on a display unit of the first electronic device after the first background pages;
  a determining module, upon execution by the at least one processor, controlling the at least one processor to determine whether one second application icon of the second background pages displayed on the display unit of the first electronic device being moved to one first background page of the first electronic device, and to determine the moved second application icon as a target icon; and
  a transmission module, upon execution by the at least one processor, controlling the at least one processor to control the first electronic device to acquire data of the target icon from the second electronic device, wherein the transmission module further controls the at least one processor to detect whether the first electronic device is connected to the second electronic device, to store the data of the target icon received when the first electronic device is not connected to the second electronic device as the first electronic device is receiving the target data of the target icon from the second electronic device, and to continue to receive the remaining data of the target icon when a connection is restored between the first electronic device and the second electronic device.

2. The system according to claim 1, wherein the determining module further, upon execution by the at least one processor, controls the at least one processor to determine whether one first application icon displayed on the display unit of the first electronic device is being moved to the second background page of the first electronic device, and to determine the moved first application icon as the target icon.

3. The system according to claim 1, wherein the page display module further, upon execution by the at least one processor, controls the at least one processor to acquire the second background pages, to add new pages after the first background pages, and to display the acquired second background pages on the added new pages.

4. The system according to claim 1, further comprising an authorization module, wherein the authorization module upon execution by the at least one processor, controls the at least one processor to authorize the first electronic device to acquire the data of the target icon.

5. The system according to claim 4, wherein the authorization module further, upon execution by the at least one processor, controls the at least one processor to display an authorization interface on the display unit when receiving the request for reading data of the target icon from the second electronic device, to receive authorization information input by the authorization interface, to compare the received authorization information with a preset authorization information, and to authorize the first electronic device to acquire the data of the target icon when the received authorization information matches the preset authorization information.

6. The system according to claim 1, further comprising a cancellation module, wherein the cancellation module, upon execution by the at least one processor, controls the at least one processor to display a cancellation interface on the display unit when the first electronic device is receiving data from the second electronic device, to receive a cancellation operation input from the cancellation interface, and to cancel receiving data from the second electronic device in response to the cancellation operation.

7. A data sharing method, applied on a first electronic device comprising a plurality of first background pages, each first background page displaying a plurality of first application icons, the method comprising:
 controlling the first electronic device to communicate with a second electronic device through a communication unit;
 acquiring second background pages including a plurality of second application icons from the second electronic device, and displaying the acquired second background pages on a display unit of the first electronic device after the first background pages;
 determining whether one second application icon of the second background pages displayed on the display unit of the first electronic device is moved to one first background page of the first electronic device, and determining the moved second application icon as a target icon;
 acquiring data of the target icon from the second electronic device, and;
 detecting whether the first electronic device is connected to the second electronic device, storing the data of the target icon received when the first electronic device is not connected to the second electronic device as the first electronic device is receiving the target data of the target icon from the second electronic device, and continuing receiving the remaining data of the target icon when a connection is restored between the first electronic device and the second electronic device.

8. The method according to claim 7, further comprising:
 determining whether one first application icon displayed on the display unit of the first electronic device is moved to the second background page of the first electronic device, and determining the moved first application icon as the target icon.

9. The method according to claim 7, further comprising:
 acquiring the second background pages;
 adding new pages after the first background pages; and
 displaying the acquired second background pages on the added new pages.

10. The method according to claim 7, further comprising:
 authorizing the first electronic device to acquire the data of the target icon.

11. The method according to claim 10, further comprising:
 displaying an authorization interface on the display unit when receiving the request for reading data of the target icon from the second electronic device, receiving authorization information input by the authorization interface, comparing the received authorization information with a preset authorization information, and authorizing the first electronic device to acquire the data of the target icon when the received authorization information matches the preset authorization information.

12. The method according to claim 7, further comprising:
displaying a cancellation interface on the display unit when the first electronic device is receiving data from the second electronic device, receiving a cancellation operation input from the cancellation interface, and cancelling receiving data from the second electronic device in response to the cancellation operation.

* * * * *